United States Patent [19]

Fujishiro et al.

[11] Patent Number: 5,599,486
[45] Date of Patent: Feb. 4, 1997

[54] METHOD FOR CONTROLLING AN EJECTOR AND INJECTION MOLDING MACHINE

[75] Inventors: Atsushi Fujishiro; Yukio Ishii; Hitoshi Hara, all of Chiba, Japan

[73] Assignee: Sumitomo Heavy Industries, Ltd., Japan

[21] Appl. No.: 399,584

[22] Filed: Mar. 7, 1995

Related U.S. Application Data

[63] Continuation-in-part of Ser. No. 132,667, Oct. 6, 1993, abandoned.

[30] Foreign Application Priority Data

| Oct. 9, 1992 | [JP] | Japan | 4-271863 |
| Dec. 4, 1992 | [JP] | Japan | 4-325291 |

[51] Int. Cl.⁶ .................................................. B29C 45/40
[52] U.S. Cl. .................. 264/40.1; 264/334; 425/139; 425/556; 425/444
[58] Field of Search .......................... 264/40.1, 334, 264/69; 425/139, 556, 444

[56] References Cited

U.S. PATENT DOCUMENTS

| 5,405,259 | 4/1995 | Morikita | 425/556 |
| 5,439,371 | 8/1995 | Sawaya | 425/556 |
| 5,472,335 | 12/1995 | Morikita | 264/334 |
| 5,492,658 | 2/1996 | Ohno | 264/334 |

FOREIGN PATENT DOCUMENTS

| 591983 | 4/1994 | European Pat. Off. | 425/139 |
| 62-117720 | 5/1987 | Japan | 425/139 |
| 4-133711 | 5/1992 | Japan | 425/139 |
| 5-329908 | 12/1993 | Japan | 425/135 |

*Primary Examiner*—Jill L. Heitbrink
*Attorney, Agent, or Firm*—Lorusso & Loud

[57] ABSTRACT

A method for ejecting a molded product from a die. The method includes advancing an ejector pin from a withdrawn position to a projected position for ejecting a molded product and withdrawing the ejector pin from the projected position to the withdrawn position. At a preset range in at least one of the advancing step and the withdrawing step, the ejector pin undergoes very small reciprocating movements having a period less than 0.1 seconds. When the ejector pin is advanced while very small reciprocation is performed over a preset range in the advancing step, energy due to the projection of the ejector pin is continuously and gradually dissipated. When the ejector pin is withdrawn while very small reciprocation is performed over a preset range in the withdrawing step, the molded product is easily separated from the ejector pin. Accordingly, scattering of molded products and generation of cracks in the molded products can be prevented. Also, the molded product is prevented from being placed back into the cavity. Further, a dwell step may be provided in which the ejector pin is maintained at its projected position while being subjected to very small reciprocation having a period shorter than 0.1 seconds.

15 Claims, 12 Drawing Sheets

FIG. I
(PRIOR ART)
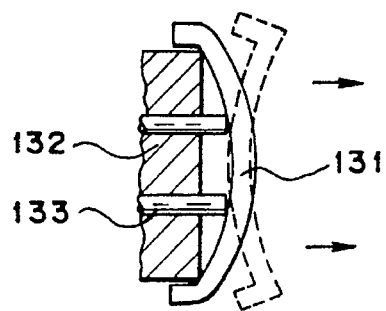
FIG. 2
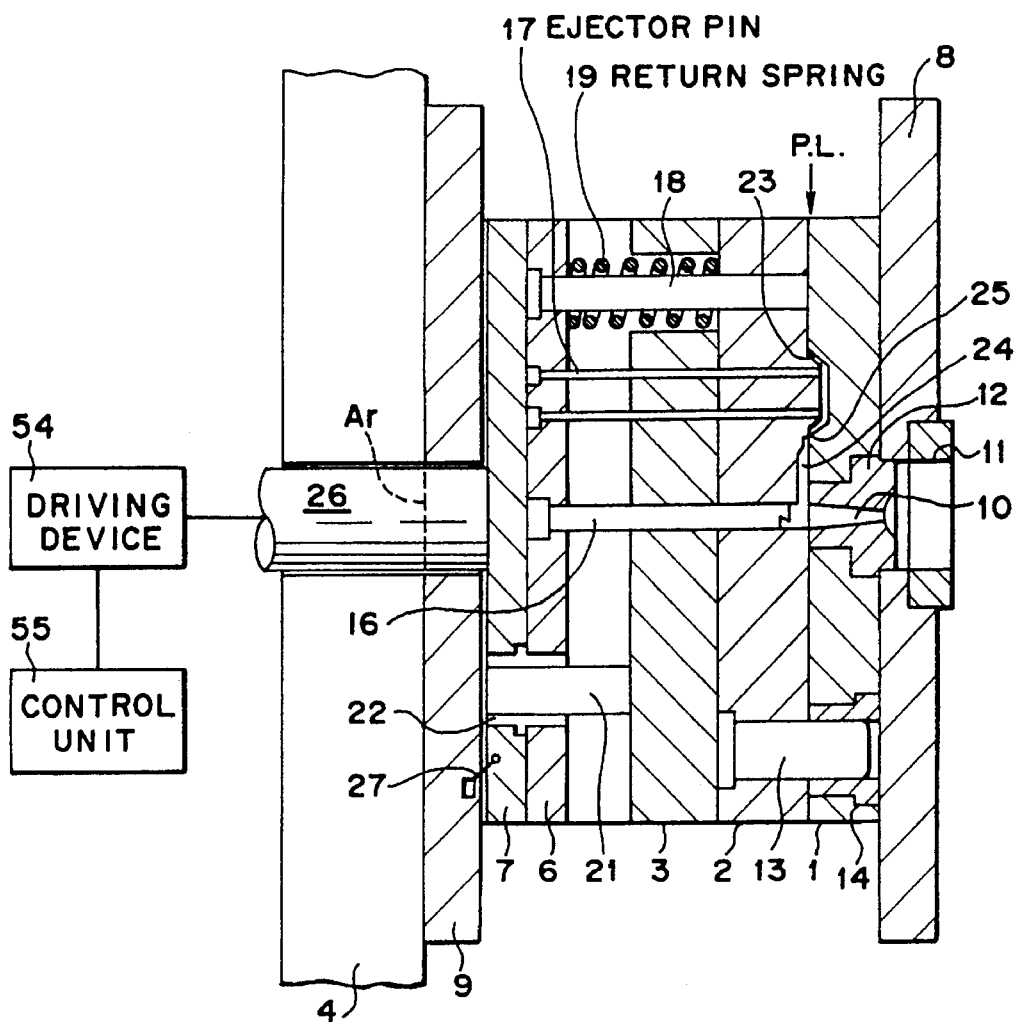

METHOD FOR CONTROLLING AN EJECTOR AND INJECTION MOLDING MACHINE

CROSS REFERENCE TO RELATED APPLICATION

This application is a Continuation-in-Part of application Ser. No. 08/132,667, filed Oct. 6, 1993 and entitled "INJECTION MOLDING MACHINE AND METHOD FOR CONTROLLING EJECTION THEREIN" now abandoned.

BACKGROUND OF THE INVENTION

1. Field of the Invention

The present invention relates to a method for controlling an ejector of an injection molding machine, and to an injection molding machine in which such a method is utilized.

2. Description of the Related Art

In a conventional injection molding machine, a resin heated and melted in a heating cylinder is charged into a cavity of a die device in a pressurized state, and then cooled and solidified in the cavity to obtain a molded product.

Such a die device is composed of a stationary die and a movable die, and the movable die is advanced and withdrawn by a die clamping device so that the movable die contacts and separates from the stationary die, thereby performing die closing, die clamping, and die opening. In the die opening step, the movable die is withdrawn while holding the molded product therein, and the molded product is then separated from the movable die by an ejector device. That is, an ejector pin of the ejector device is advanced to eject the molded product from the movable die.

To this end, the ejector pin is disposed with its tip end facing the cavity and with its rear end fixed to an ejector plate, and an ejecting cylinder is connected to the back of the ejector plate through an ejector rod. Thus, when the ejecting cylinder is operated, the ejector plate is advanced via the ejector rod so that the ejector pin fixed to the ejector plate moves forward to eject a molded product.

To obtain a mechanical connection between the ejector cylinder and the ejector plate, the ejector rod is fixed to the ejector plate, or is arranged to contact and separate from the ejector plate. In the latter case, the ejector plate cannot be withdrawn by the ejector rod, and therefore a return spring is provided to withdraw the ejector plate.

FIG. 1 is a diagram showing ejection of a molded product by a conventional ejector device.

In FIG. 1, reference numeral 131 denotes a molded product, reference numeral 132 denotes a movable die, and reference numeral 133 denotes an ejector pin, the rear end of which is fixed to an unillustrated ejector plate. The molded product 131 is ejected by the ejector pin 133.

However, if a large frictional resistance exists between the molded product 131 and the movable die 132 when the ejector pin 133 contacts the molded product by its advancing movement in the advancing step of an ejecting operation, the tip of the ejector pin 133 thrusts into the molded product 131, thereby damaging the molded product 131, or the molded product 131 scatters in all directions upon separation from the movable die 132.

When the molded product 131 is separated from the movable die 132, the molded product 131 is first deformed into an arched shape, as shown by a solid line in FIG. 1, and is then restored from the deformed state to its original state. After that, it is deformed in the opposite direction, as shown by a broken line. Accordingly, the molded products may scatter in all directions by the deformation restoring force, and/or cracks or the like may be produced in the molded product 131.

When the ejector pin is withdrawn in the withdrawing step, the molded product 131 which has been separated from the movable die 132 may be placed back into the cavity of the movable die 132 due to the attachment of the molded product 131 to the ejector pin 133. Also, the molded product 131 may remain in the movable die 132 due to partial engagement therewith or due to static electricity.

To prevent the molded product 131 from being damaged or scattered during the advancing step, an ejector device has been proposed in which the speed of the ejector pin 133 is changed in the middle of the advancing movement (the rightward movement in FIG. 1) from the withdrawn position to the projected position. With this control, the speed of the ejector pin 133 can be lowered before the ejector pin 133 contacts a molded product 131.

However, in the conventional ejector device, the ejection speed cannot be changed at an optimal position, and the ejector pin 133 therefore advances at a low speed even before contacting the molded product. Accordingly, the ejecting operation involves a loss of time, so that a longer time is needed to complete the ejecting operation, and production costs increase accordingly.

In another ejector device, the ejector pin 133 is reciprocated a plurality of times, by an unillustrated ejecting cylinder, with repeated advancing and withdrawing. That is, after an advance from the withdrawn position to the projected position, the ejector pin 133 is withdrawn to a preset intermediate position in the stroke or to the withdrawn position (the original point of the stroke).

The ejector pin 133 is reciprocated a plurality of times between the projected position and the preset position or between the projected position and the withdrawn position.

In the latter systems, at least 0.1 seconds is needed to withdraw the ejector pin 133 to the preset position or the withdrawn position. Accordingly, if the ejector pin 133 is repeatedly reciprocated between the projected position and the preset position or between the projected position and the withdrawn position, an additional considerable length of time is needed in the ejecting operation. This prolongs the time required to complete the ejecting operation, resulting in increased operational costs.

Moreover, an operator must set advancing speed, advancing pressure, withdrawing speed, etc., for the above-described reciprocation between advance and withdrawal, in addition to projecting speed, projecting pressure, withdrawing speed, etc., which regulate the advancing step and withdrawing step. Accordingly, the operation for setting these parameters is troublesome.

In still another conventional ejector device, the ejector pin 133 is withdrawn by a large stroke or a full stroke in the withdrawing step such that an ejector plate carrying the ejector pin 133 hits an unillustrated movable die mounting plate, thereby generating a shock, by which the molded product 131 is separated from the ejector pin 133. Also, in this ejector device, noise exceeding 90 dB is generated when the ejector plate hits the movable die mounting plate.

SUMMARY OF THE INVENTION

An object of the present invention is to solve the problems of conventional ejector devices, and to provide a method for controlling an ejector and an injection molding machine which can prevent a molded product from being damaged and from scattering in all directions, and prevent the formation of cracks in the molded product.

Another object of the present invention is to provide a method for controlling an ejector and an injection molding machine to prevent a molded product which has been separated from a movable die from being placed back into the cavity of the movable die due to the attachment of the molded product to the ejector pin, and also prevent the molded product from remaining in the cavity due to engagement with or attachment to the movable die.

Still another object of the present invention is to provide a method for controlling an ejector and an injection molding machine which can reliably eject a molded product in a shorter time, which can simplify the operation, and reduce the shock sound generated due to the collision of an ejector plate with a movable die mounting plate which occurs during the withdrawing step of the ejector pin.

To achieve the above-described objects, a method for controlling an ejector according to the present invention includes the steps of advancing an ejector pin from a withdrawn position to a projected position for ejecting a molded product, and withdrawing the ejector pin from the projected position to the withdrawn position.

In at least one of the advancing step and the withdrawing step, the ejector pin is moved with very small reciprocating movements, each substantially completed within a period of time less of than 0.1 seconds, over a preset range.

When the ejector pin is moved with very small reciprocation over the preset range in the advancing step, very short-term advancing and withdrawing movements are repeated. Accordingly, the energy of the projection of the ejector pin is continuously and gradually discharged. Therefore, the speed of projection can be increased so as to shorten the operational cycle time. Moreover, damage to the molded product due to thrusting of the ejector pin into the molded product, scattering of the molded product, and generation of cracks in the molded product can be prevented.

Also, when the ejector pin is moved with very small reciprocation over the preset range in the withdrawing step, a molded product in engagement with the movable die can be separated from the movable die by the very small reciprocation. Also, the molded product can be easily separated from the ejector pin. Accordingly, the molded product can be prevented from being placed back into the cavity.

Since the molded product is sufficiently separated from the movable die, the molded product is prevented from electrostatically adhering to the movable die. Accordingly, it becomes possible to prevent the molded product from being caught by the dies during a subsequent die closing operation.

In addition, the shock generated when the ejector plate hits the movable die mounting plate can be decreased, because the ejector plate is withdrawn at a reduced speed.

In the method according to the present invention, it is preferred that each small reciprocating movement performed over the preset range in the advancing step comprises a very small advance of the ejector pin over a first distance and a very small withdrawal of the ejector pin over a second distance, which is shorter than the first distance.

It is also preferred that each small reciprocating movement performed within at the preset range in the withdrawing step comprises a very small advance of the ejector pin over a first distance and a very small withdrawing movement of the ejector pin over a second distance, which is longer than the first distance.

Another method for controlling an ejector according to the present invention includes the steps of advancing an ejector pin from a withdrawn position to a projected position for ejecting a molded product, maintaining the ejector pin at the projected position while applying to the ejector pin very small reciprocating movements, each substantially having a period of time of less than 0.1 seconds, and withdrawing the ejector pin from the projected position to the withdrawn position.

In this case, the ejector pin is maintained at the projected position while being subjected to vibration consisting of very small reciprocation. During this period, very short advancing and withdrawing movements are repeated. Accordingly, the generation of cracks and spring-off of the molded product can be prevented. Also, the molded product can be reliably separated from the die.

In this method, it is preferred that the ejector pin undergo very short reciprocating movements, each having a period of time of less than 0.1 seconds within a preset range in at least one of the advancing step and the withdrawing step.

In the present invention, it is preferred that the ejector pin be advanced in the advancing step under at least one of a speed control and a pressure control.

It is also preferred that the ejector pin be advanced in the advancing step under the speed control and the pressure control until lapse of a predetermined change-over time, and that the control mode thereafter be switched between the speed control and the pressure control.

It is also preferred that the ejector pin be advanced in the advancing step under the speed control and the pressure control until the ejector pin reaches a predetermined change-over position, and that the control mode be switched thereafter between the speed control and the pressure control.

The present invention, preferably additionally comprises the step of further advancing the ejector pin after the dwell step and before the withdrawing step. In this case, a molded product can be reliably ejected by further advancement, even in the case where the molded product cannot be ejected by the very small reciprocation at the projected position.

An injection molding machine according to the present invention includes a stationary die and a movable die disposed in an opposed relationship thereto, for movement into and out of contact with the stationary die to define a cavity therebetween, an ejector pin disposed with its tip end facing the cavity, drive means for moving the ejector pin, and a control unit for controlling the drive means.

The control unit comprising means for imparting to the ejector pin very small reciprocating movements, each having a period of time of substantially less than 0.1 seconds. The drive means may be an ejector cylinder or a servomotor.

BRIEF DESCRIPTION OF THE DRAWINGS

The structure and features of the injection molding machine and the method for controlling an ejector according to the present invention will be readily appreciated as the same become better understood by referring the accompanying drawings, in which:

FIG. 1 is a diagram showing a molded product ejected by a conventional ejector device;

FIG. 2 is a sectional view of an injection molding machine according to a first embodiment of the present invention;

DESCRIPTION OF PREFERRED EMBODIMENTS

Figure 3:
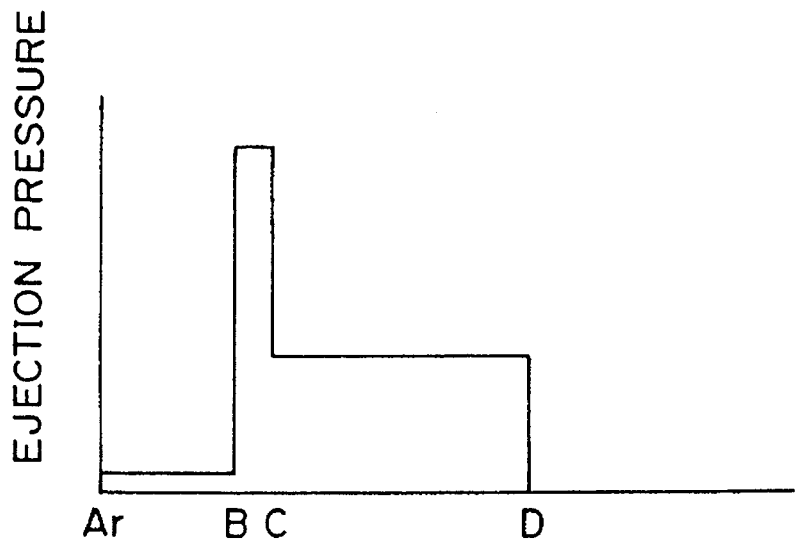
FIG. 3 is a graph showing the relationship between the amount of projection and ejection pressure in the first embodiment of the present invention.

The present invention will now be described by way of preferred embodiments in connection with the accompanying drawings.

Referring to FIG. 2, an injection molding machine according to a first embodiment of the present invention is shown in sectional view. This injection molding machine comprises a stationary die 1, a movable die 2 disposed in an opposed relationship to the stationary die 1 for movement into and out of contact with the stationary die 1, so as to define a cavity 23 between the dies when in contact with the stationary die 1, the movable die 2 being reinforced by a receiving plate 3, a movable platen 4, an upper ejector plate 6, a lower ejector plate 7, a stationary mounting plate 8 for mounting the stationary die 1 to a stationary plate (which is not shown), and a movable mounting plate 9 for mounting the movable die 2 to the movable platen 4.

The injection molding machine further includes a sprue 10, a locating ring 11 for facilitating the mounting of the stationary die 1 to the stationary platen and for permitting a smooth nozzle engagement, a sprue bush 12 for guiding a resin injected from an injecting nozzle which is not shown, a guide pin 13 mounted to the movable die 2 for guiding the stationary die 1, a guide bush 14, a sprue lock pin 16 disposed with its tip end facing the sprue 10 to extend through the movable die 2, an ejector pin 17 disposed with its tip end facing the cavity 23 to extend through the movable die 2, a return pin 18, and a return spring 19 disposed to enclose the return pin 18 for biasing the upper ejector plate 6 rearwardly.

Each of the sprue lock pin 16, the ejector pin 17 and the return pin 18 has, at its rear or trailing end, a flange portion which is clamped between the upper and lower ejector plates 6 and 7.

Further, the injection molding machine includes an ejector guide pin 21 functioning to permit a smooth ejection by the ejector pin 17, an ejector guide pin bush 22, a runner 24, and a gate 25. P.L. in FIG. 2 designates a parting line between the stationary and movable dies 1 and 2.

In the injection molding machine having the above-described construction, when the resin is injected in a condition in which the injecting nozzle is engaged with the sprue bush 12, the resin is passed through the sprue 10, the runner 24 and the gate 25 and enters the cavity 23.

Upon the completion of an injection step, a pressure maintaining step is conducted for replenishing the volume of resin in the cavity 23 lost to shrinkage. Then, the resin is cooled to provide a molded product which is not shown. Thereafter, the movable die 2 is withdrawn leftward as viewed in FIG. 2, away from the stationary die 1, thus effecting the opening of the dies.

At this time, the ejector pin 17 is advanced rightward as viewed in FIG. 2, thereby causing the molded product to be ejected from the movable die 2. For this purpose, an ejector rod 26 is disposed at the rear end of the lower ejector plate 7 and driven by a driving device 54 for advancing and withdrawing movement into and out of contact therewith. The driving device 54 comprises, for example, an ejector cylinder. A control unit 55 controls the driving device 54, and Ar indicates the withdrawal limit position for the ejector rod 26.

A withdraw-certifying switch 27 is disposed between the lower ejector plate 7 and the movable mounting plate 9 to detect the completion of the withdrawing movement of the ejector plates 6 and 7. The injection molding machine may be operated in an automatic mode, a semi-automatic mode or a manual mode. When the operational mode of the machine has been switched over from the automatic mode or the semiautomatic mode to the manual mode, or when the ejector pin 17 has been withdrawn to its ejection starting position, the withdraw-certifying switch 27 is turned OFF.

In the first embodiment, the relationship between the amount of projection and the ejecting pressure is established as shown in FIG. 3.

In FIG. 3, Ar indicates the withdraw limit position for the ejector rod 26; B indicates an ejection starting position i.e., a withdrawn position occupied by the ejector pin 17 when the ejector plates 6 and 7 have been withdrawn by the action of the return spring 19; C indicates a release position in which a molded product (not shown) is released from the movable die 2; and D indicates an advance limit position, i.e., an ejected position for the ejector pin 17, which is the position where the molded product is ejected.

Figure 4:
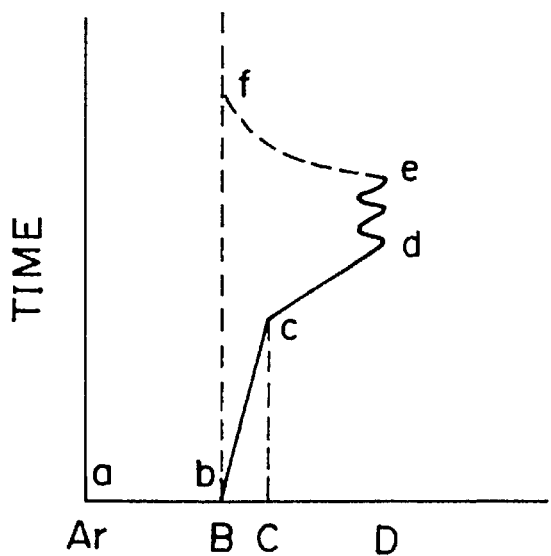
FIG. 4 is a graph showing the relationship between the amount of projection and time in the first embodiment of the present invention.

In the first embodiment, the relationship between the ejecting position and the time is established as shown in FIG. 4.

In FIG. 4, Ar indicates the withdrawal limit position for the ejector rod 26 (see FIG. 2); B indicates the withdrawn position for the ejector pin 17; C indicates the release position for the molded product (not shown); and D indicates the ejected position for the molded product.

In addition, in FIG. 4, a indicates an operation starting point, wherein the ejector rod 26 is in its withdraw limit position Ar; b indicates an ejection starting point at which an advancing step is started, wherein the ejector pin 17 is in its withdrawn position B; c indicates a release point at which the release of the molded product from the movable die 2 is started, wherein adhesive sticking between the molded product and the movable die 2 is loosened by advancement of the ejector pin 17, thereby causing a release. At this time, the ejector pin 17 is in the release position C. Then, the ejector pin 17 is moved at a low speed from the withdrawn position B to the release position C. This prevents the molded product from being scattered by a deformation/restoring force, and prevents cracks from being produced in the molded product.

Alternatively, the releasing of the molded product may be started when the ejector pin 17 has reached the release position C, or the releasing of the molded product may be started when the release point c has been detected by a timer which is not shown.

In this embodiment, the control of the ejecting pressure is carried out in correspondence to a load, until the release point c is reached, while the load corresponding to the ejecting pressure is detected as a hydraulic pressure, an electric current or torque, and when the load has been reduced, the release point c is detected.

When the reaching of the release point c has been detected, the control of the ejection pressure is immediately switched over to a control of speed, so that the ejector pin 17 is advanced at a high speed.

Further, in FIG. 4, d indicates a dwell step starting point at which a very small reciprocation is started; and e indicates the dwell step completion point at which the very small reciprocation is completed. During the dwell step, the ejector pin 17 is in the ejected position D in which the molded product is reliably ejected (drops from the movable die). At the dwell step starting point d, the very small reciprocation is started by operating an ejector device or by instantaneously withdrawing the ejector pin 17 with the spring force of the return spring 19, and the repeating of the ejecting and withdrawing movements of the ejector pin 17 within a very short time causes a very small vibration. At this time, the ejector pin 17 thrusting into the molded product is withdrawn, while the molded product is intended to be further advanced by an inertia force generated before the molded product reaches the ejected position D, and thus, the molded product is completely released and dropped from the die.

Therefore, there is no time loss in the ejection step and, in addition, an improved efficiency of operation is provided.

In the above dwell step, it is necessary to reciprocate the ejector pin 17 at a required speed within a very short time, but each of the time and speed for advancing and withdrawing movements of the ejector pin 17 may be values sufficient to permit the release of the bite-in sticking of the ejector pin 17 in the molded product. The values need not be substantially changed after being once set, and in a special case, they may be set at a control board which is not shown. Usually, an operator sets only the number of repeats of the advancing and withdrawing movements of the ejector pin 17 on a setting panel which is not shown.

When the very small reciprocation is repeated by a preset number of times (a single very small reciprocation is performed in a required time such as 0.01 seconds or less, preferably in a range of 0.01 to 0.02 seconds), the withdrawing step is started and the ejector pin 17 is withdrawn from the ejected position D to the withdrawn position B. It is noted herein that f indicates the withdrawing step completion point.

At this time, the ejector pin 17 is withdrawn from the ejected position D to the withdrawn position B by only the spring force of the return spring 19. Therefore, at the withdrawing step completion point f, the shock sound generated by collision of the lower ejector plate 7 against the movable mounting plate 9 is reduced.

In the present embodiment, the controls of the ejection pressure and the speed are carried out according to a computer program of the control unit 55, but the ejector rod 26 may be operated manually, and in this case, the ejector rod 26 can be withdrawn to the withdraw limit position Ar. This ensures that the ejector rod 26 and the movable mounting plate 9 can be prevented from being damaged due to interference with each other, when the movable die 2 is mounted on the movable mounting plate 9.

A method for controlling the ejecting operation according to the present invention will be described below.

Figure 5:
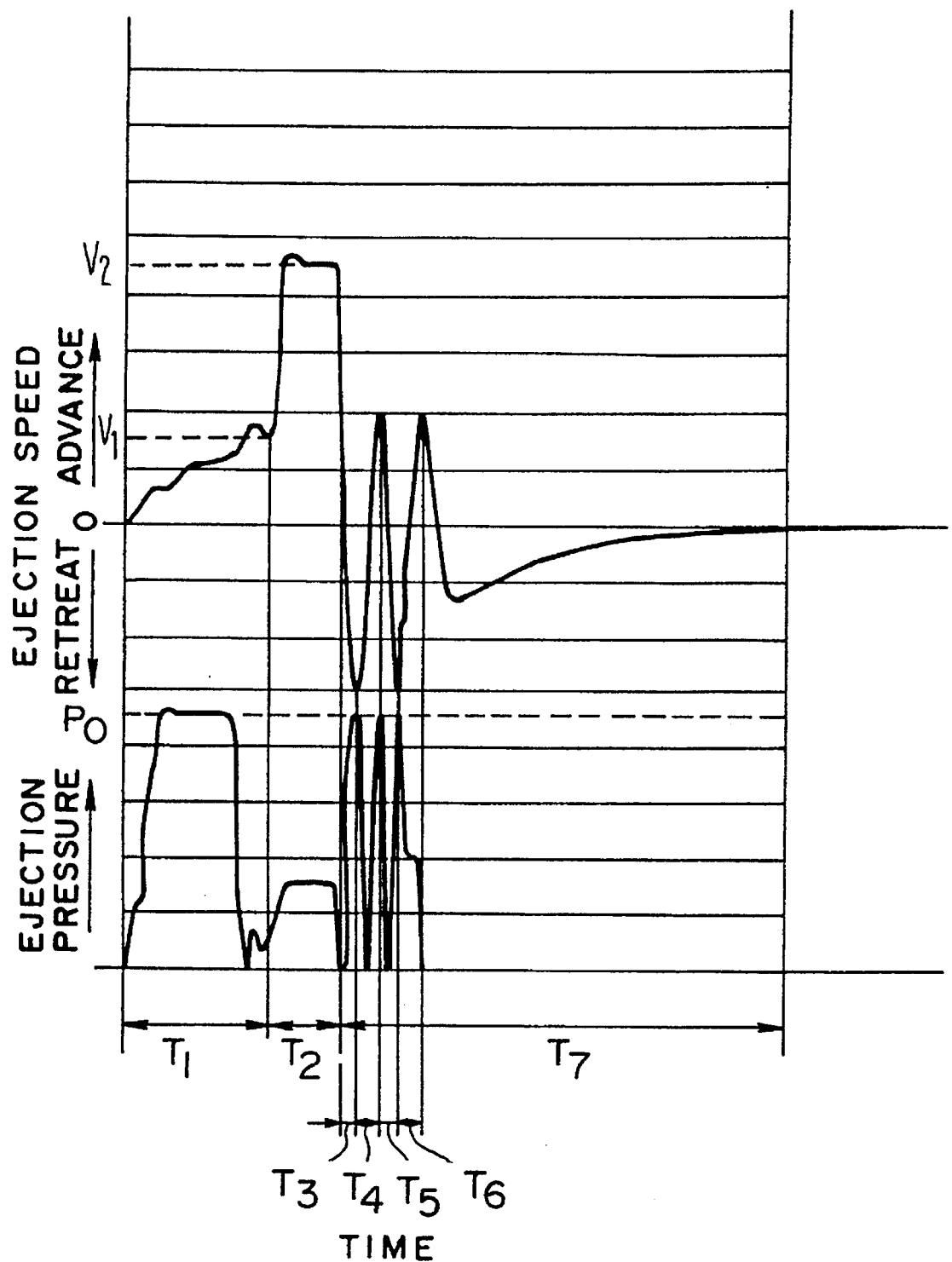
FIG. 5 is a time chart showing variations in the ejecting speed and the ejecting pressure of the ejector pin in the first embodiment of the present invention.

First, in starting the operation of the ejector device, a time $T_1$ for an advancing step is set by a timer which is not shown, and a preset value $P_0$ of ejection pressure is set, as shown in FIG. 5. During the time $T_1$, the ejector pin 17 (FIG. 2) is advanced according to the control of the ejection pressure. Therefore, the molded products (which are not shown) can be prevented from being scattered, and cracks can be prevented from forming in the molded product.

When the ejector pin 17 has reached the release position C (see FIG. 4), the molded product is released from the movable die 2. Thereafter, when the sticking force between the molded product and the movable die is eliminated, the load is reduced, so that the ejection speed $V_1$ of the ejector pin 17 is rapidly increased. For this reason, an upper limit ejection speed $V_2$ may be previously set.

Then, during a time $T_2$, the ejector pin 17 is advanced at the upper limit speed $V_2$ according to the speed control until it reaches the ejected position D. During this time, the load is reduced.

Subsequently, the dwell step is started at the ejected position D, so that the very small advancing and withdrawing movements of the ejector pin 17 are repeated. It is necessary to perform the very small reciprocation of the ejector pin 17 at the required speed within the very short time, but each of advancing times $T_4$ and $T_6$ and withdrawing times $T_3$ and $T_5$ and advancing and withdrawing speeds need not normally be changed; however, in a special case may be changed on the control board (which is not shown).

In the very small reciprocation in the present embodiment, each of the withdrawing times $T_3$ and $T_5$ is 0.01 seconds; each of the advancing times $T_4$ and $T_6$ is 0.02 seconds; each of the advancing and withdrawing speeds is either medium or high; and the number of repeats is two. By setting the times and speeds in this manner, the molded product can properly be ejected.

When the dwell step has been completed, the withdrawing step is started and the ejector plates 6 and 7 are withdrawn by the action of the return spring 19, which is attended by the withdrawing movement of the ejector pin 17.

Upon the completion of the withdrawing movement of the ejector plates 6 and 7, the withdraw-certifying switch 27 is operated. On the other hand, the count-down of a time $T_7$ is started at a point in time at which the time $T_2$ has lapsed and, upon the operation of the withdraw-certifying switch 27 and upon reaching time $T_7$ as determined by the timer, the subsequent die-clamping is started.

In the present embodiment, the timer is used to change-over the individual operations from one to another, and change-over times are set in the timer, but alternatively, a position detector may be used in place of the timer, and change-over positions may be established.

A second embodiment of the present invention will now be described in connection with FIGS. 6 and 7.

Figure 6:
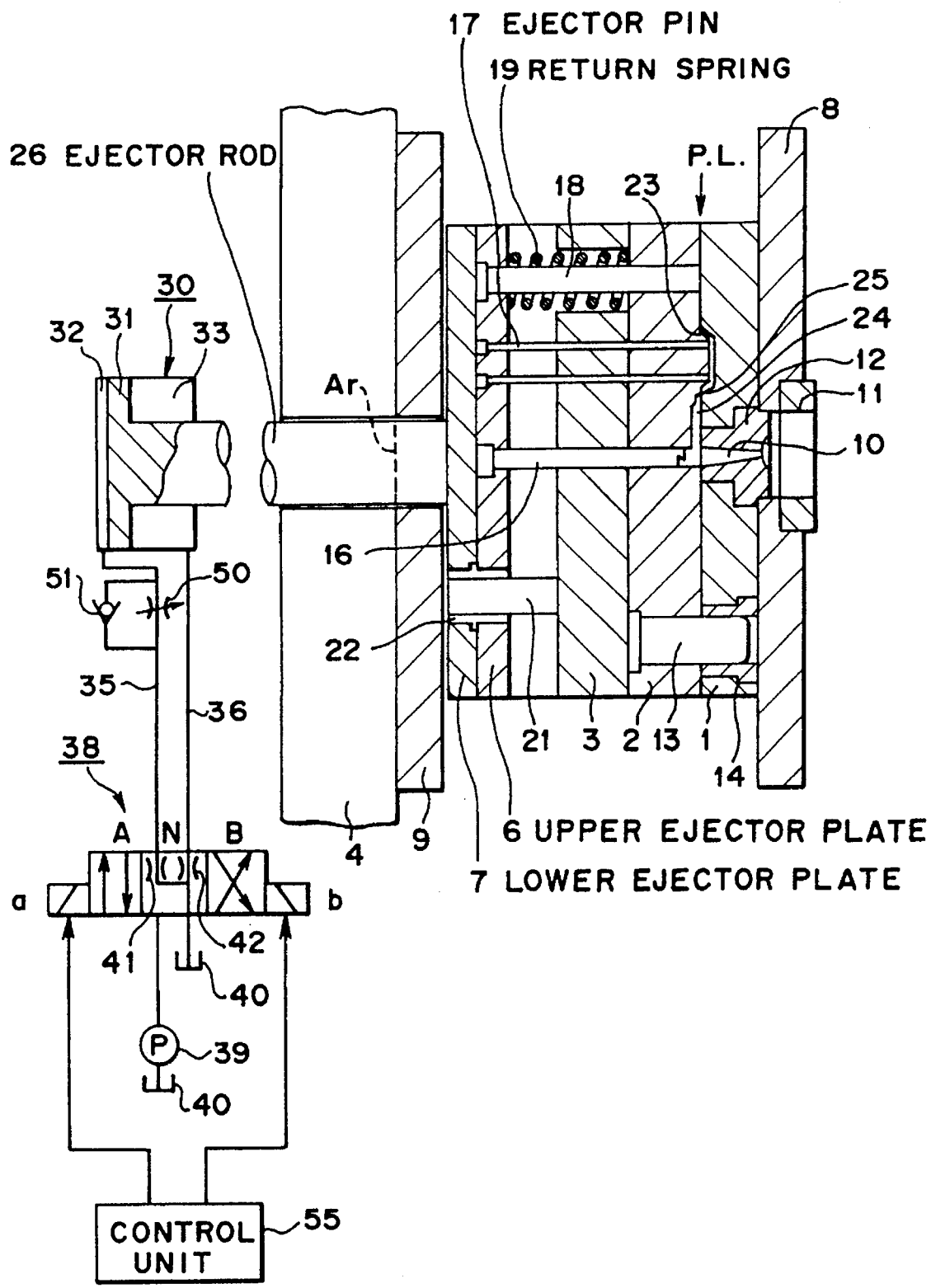
FIG. 6 is a sectional view of an injection molding machine according to a second embodiment of the present invention.
Figure 7:
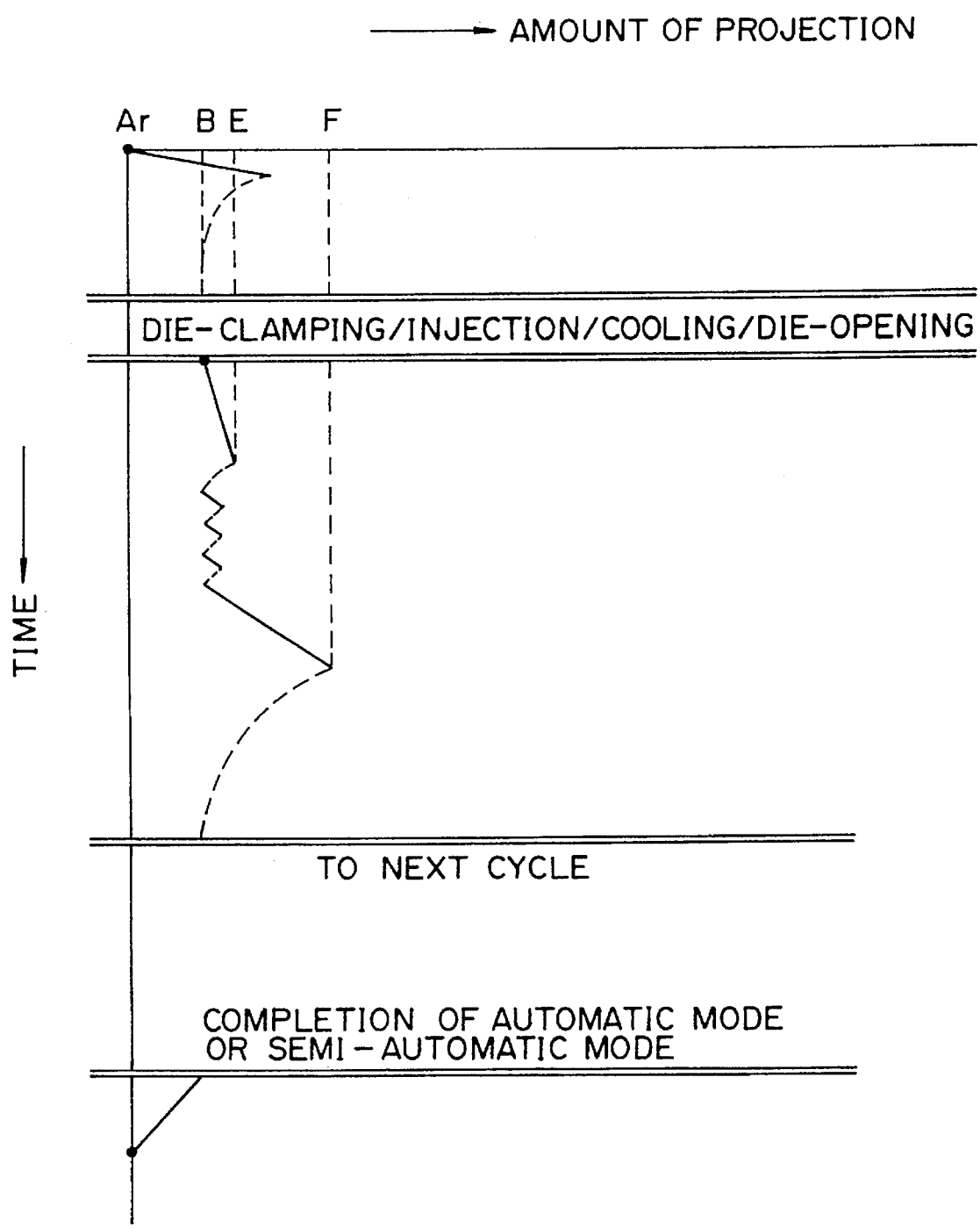
FIG. 7 is a graph showing the relationship between the amount of projection and time in the second embodiment of the present invention.

Referring to FIG. 6, an injection molding machine of the second embodiment comprises a stationary die 1, a movable die 2 disposed in an opposed relationship to the stationary die 1 for movement into and out of contact with the stationary die 1, so as to define a cavity 23 therebetween when in contact with the stationary die 1, the movable die 2 being reinforced by a receiving plate 3, a movable platen 4, an upper ejector plate 6, a lower ejector plate 7, a stationary mounting plate 8 for mounting the stationary die 1 to a stationary plate (which is not shown), and a movable mounting plate 9 for mounting the movable die 2 to the movable platen 4.

Further, the injection molding machine includes a sprue 10, a locating ring 11 for facilitating the mounting of the stationary die 1 to the stationary platen and for permitting a smooth nozzle engagement, a sprue bush 12 for guiding a resin injected from an injecting nozzle which is not shown, a guide pin 13 mounted on the movable die 2 for guiding the stationary die 1, a guide bush 14, a sprue lock pin 16 disposed with its tip end facing the sprue 10 to extend through the movable die 2, an ejector pin 17 disposed with its tip end facing the cavity 23 to extend through the movable die 2, a return pin 18, and a return spring 19 disposed to enclose the return pin 18 for biasing the upper ejector plate 6 rearwardly.

Each of the sprue lock pin 16, the ejector pin 17 and the return pin 18 has a flange portion at its rear or trailing end, which flange portion is clamped between the upper and lower ejector plates 6 and 7.

The injection molding machine further includes an ejector guide pin 21 functioning to permit a smooth ejection by the ejector pin 17, an ejector guide pin bush 22, a runner 24, and a gate 25. P.L. in FIG. 2 designates the parting line between the stationary and movable dies 1 and 2.

In the injection molding machine having the above-described construction, when the resin is injected with the injecting nozzle engaging the sprue bush 12, the resin is passed through the sprue 10, the runner 24 and the gate 25 into the cavity 23.

Upon the completion of an injection step, a pressure maintaining step is conducted for replenishing the volume of resin in the cavity 23 lost to shrinkage. Then, the resin is cooled to provide a molded product which is not shown. Thereafter, the movable die 2 is withdrawn leftward as viewed in FIG. 2, away from the stationary die 1, thus effecting the opening of the dies.

At this time, the ejector pin 17 is advanced rightward as viewed in FIG. 2, thereby causing the molded product to be ejected from the movable die 2. For this purpose, an ejector rod 26 is disposed at a rear end of the lower ejector plate 7 and driven for advancing and withdrawing movement into and out of contact therewith by an ejecting cylinder 30 functioning as a driving device. Ar indicates a withdraw limit position for the ejector rod 26.

A piston 31 is slidably disposed in the ejecting cylinder 30 to define a first oil chamber 32 and a second oil chamber 33. The first and second oil chambers 32 and 33 are connected to a hydraulic valve 38 through oil passages 35 and 36, respectively. An oil pump 39 supplies oil into the first and second oil chambers 32 and 33, and reference numeral 40 denotes an oil tank.

The hydraulic valve 38 is operated by solenoids a and b, so that it assumes a position A, when the solenoid a is turned ON, thereby permitting oil discharged by the oil pump 39 to be supplied through the oil passage 35 into the first oil chamber 32, while permitting the oil in the second oil chamber 33 to be drained through the oil passage 35 into the oil tank 40. At this time, the ejector rod 26 is advanced.

The hydraulic oil valve 38 assumes a position B when the solenoid b is turned ON, thereby permitting the oil discharged by the oil pump 39 to be supplied through the oil passage 36 into the second oil chamber 33, while permitting the oil in the first oil chamber 32 to be drained through the oil passage 35 into the oil tank 40. At this time, the ejector rod 26 is withdrawn.

Further, the hydraulic valve 38 assumes a position N when the solenoids a and b are turned OFF, thereby permitting the oil in the first and second oil chambers 32 and 33 to be drained through the oil passages 35 and 36 into the oil tank 40. The hydraulic valve 38 includes constrictions 41 and 42, through which the oil is drained into the oil tank 40.

The solenoids a and b are connected to and turned ON and OFF by a control unit 55. Reference numeral 50 is a variable constriction, and reference numeral 51 is a check valve.

The operation of the injection molding machine having the above-described construction will be described below in connection with of FIGS. 6 and 7.

The injection molding machine may be operated in an automatic mode, a semi-automatic mode or a manual mode, but when the automatic mode or the semi-automatic mode is selected, the ejector rod 26 is advanced at a preset speed for a preset time from the withdraw limit position Ar before a first ejection is effected.

Thereafter, the solenoids a and b of the hydraulic valve 38 are turned OFF. At this time, the ejector rod 26 is withdrawn by the spring force of the return spring 19, and the oil in the first and second oil chambers 32 and 33 in the ejecting cylinder 30 is drained through the oil passages 35 and 36 and the constrictions 41 and 42, respectively, into the oil tank 40.

In this case, the oil flows through the constrictions 41 and 42, so that a resisting force opposing the spring force of the return spring 19 is generated. Therefore, the speed at which the lower ejector plate 7 is withdrawn is lowered and hence, the shock generated upon the collision of the lower ejector plate 7 against the movable mounting plate 9 is reduced, and the shock sound is also reduced on the order of 10 dB.

In addition, at this time, with the completion of the withdrawing movement of the lower ejector plate 7 upon the collision thereof against the movable mounting plate 9, the ejector rod 26 is stopped at the withdrawn position B and, hence, the first ejection is initiated from the withdrawn position B. Therefore, in conducting the ejection again, the ejector rod 26 cannot be idly moved from the withdraw limit position Ar to the withdrawn position B.

The movable platen 4 is then advanced for die-clamping, and the resin is injected and charged into the cavity 23, and then cooled, following by die-opening.

Then, the ejector rod 26 is advanced at a low speed provided according to the speed control for a preset time or until it reaches a previously established ejection position E (or until an electric motor is driven by a preset pulse number, when the electric motor is used in place of the ejecting cylinder 30). In this case, when the molded product is a hard resin, only the speed control is utilized, or when the material is a soft resin such as an elastomer, the ejector rod 26 is advanced with a low pressure provided by the control of the ejection pressure. Therefore, the ejector pin 17 cannot excessively thrust into the molded product.

Then, the dwell step is started. More specifically, the ejector pin 17 is advanced and withdrawn at a medium or high speed for a very short time less than 0.1 seconds, and the very small reciprocation movements are repeated. In the very small reciprocation of the ejector pin 17 in the present embodiment, the ejector pin 17 is advanced for 0.03 seconds and then withdrawn for 0.03 seconds, and the advancing and withdrawing movement is repeated 9 times at maximum. It should be noted that the advancing movement of the ejector pin 17 is produced by the hydraulic pressure in the ejecting cylinder 30, and the withdrawing movement of the ejector pin 17 is caused by the spring force of the return spring 19. Therefore, there is no time loss with the operation of the ejecting cylinder 30, thereby enabling a shortened cycle time ending with complete ejection of the molded product. At this time, the ejector pin 17 thrusting into the molded product is withdrawn, while the molded product is intended to be further advanced by an inertia force and, hence, is completely released and dropped from the die.

In the dwell step, it is necessary to perform a very small reciprocation movement within a very short time, but each of the time and speed for advancing and withdrawing movements of the ejector pin 17 should be sufficient to permit the release of the bite-in sticking of the ejector pin 17 to the molded product.

It should be noted that the magnitude of the amplitude of the very small reciprocation can be changed depending upon the shape, the quality and the like of the molded product.

When the depth or thickness of products to be molded is small, the molded product can be reliably ejected at this stage, and the ejector rod can be immediately withdrawn, leading to a correspondingly shortened cycle time required for complete ejection of the molded product. In addition, in the advancing step, the ejector rod 26 is advanced at a low speed, leading to a reduced shock to the molded products which do not scatter, and/or cracks are not produced in the molded product.

When the solenoids a and b of the hydraulic valve 38 are then turned OFF, the ejector rod 26 is withdrawn by the spring force of the return spring 19, and the oil in the first and second oil chambers 32 and 33 in the ejecting cylinder 30 is drained through the oil passages 35 and 36 and the constrictions 41 and 42, respectively, into the oil tank 40.

In this case, the oil flows through the constrictions 41 and 42 and, hence, the speed at which the lower ejector plate 7 is withdrawn is lowered and, hence, the shock generated upon the collision of the lower ejector plate 7 against the movable mounting plate 9 is reduced, and the shock sound is also reduced on the order of 15 dB. Then, the operation proceeds to the next cycle.

When the depth or thickness of the product to be molded is large, it cannot be reliably ejected with only a very small reciprocation.

Thereafter, the advancing step is started again and the ejector rod 26 is advanced to an advance limit position F sufficient to permit the molded product to be ejected. In this case, the tip end of the ejector pin 17 is in a location sufficiently spaced apart from the movable die 2 and, hence, the molded product is reliably ejected.

If air is supplied as a jet from above the molded product, the molded product which is about to be released from the movable die 2 and the runner 24 is completely released and ejected from the movable die 2. In addition, it is possible to prevent the molded product from being scattered.

Thereafter, if the solenoids a and b of the hydraulic valve 38 are turned OFF in the withdrawing step, the ejector rod 26 is withdrawn by the spring force of the return spring 19, and the oil in the first and second oil chambers 32 and 33 in the ejecting cylinder 30 is drained through the oil passages 35 and 36 via the constrictions 41 and 42 respectively into the oil tank 40. This is followed by the next cycle.

In this case, the oil flows through the constrictions 41 and 42 and, hence, a resisting force opposing the spring force of the return spring 19 is generated.

When it is difficult to eject the molded product with the ejector pin 17, a variable constriction 50 and a check valve 51 may be disposed in parallel to each other, so that the resisting force generated during withdrawing movement of the ejector rod 26 can be varied by adjusting the variable constriction 50.

If a mode switch (not shown) is turned OFF or the manual mode is selected when the ejection in the automatic mode or the semiautomatic mode has been completed, the ejector rod 26 can be withdrawn to the withdraw limit position Ar for any time and at any speed. This causes the tip end of the ejector rod 26 to be withdrawn further than the end surface of the movable platen 4 and, hence, neither of them can be damaged in attaching and detaching the movable die 2 to and from the movable platen 4.

Both or either one of the constrictions 41 and 42 and the variable constriction 50 may be provided. Alternatively, another resisting-force generating means may be provided.

A third embodiment of the present invention will now be described with reference to FIG. 8, which shows an injection molding machine according to the third embodiment in sectional view.

This injection molding machine includes a stationary die 1, a movable die 2 disposed in an opposed relation to the stationary die 1, for movement into and out of contact with the stationary die 1, a receiving plate for reinforcing the movable die 2, and a movable platen 4. The stationary die 1 and the movable die 2 form a die unit. Also, the injection molding machine includes an upper ejector plate 6, a lower ejector plate 7 which is fixed to the upper ejector plate 6, a stationary mounting plate 8 for mounting the stationary die 1 on an unillustrated stationary plate, and a movable mounting plate 9 for mounting the movable die 2 on the movable platen 4.

The injection molding machine further includes a sprue 10, a locating ring 11 for facilitating the mounting of the stationary die 1 on the stationary platen and for permitting smooth nozzle engagement, a sprue bush 12 for guiding a resin injected from an unillustrated injecting nozzle, a guide pin 13 mounted on the movable die 2 for guiding the stationary die 1, a guide pin bush 14, a sprue lock pin 16, an ejector pin 17, the rear end of which is fixedly held by the upper ejector plate 6 and the lower ejector plate 7, an ejector guide pin 21 for assisting smooth ejection by the ejector pin 17, and an ejector guide pin bush 22. In FIG. 8, reference numeral 23 denotes a cavity formed between the stationary die 1 and the movable die 2, reference numeral 24 denotes a runner, and reference numeral 25 denotes a gate. P.L. represents a parting line between the stationary and movable dies 1 and 2, and 65 denotes a position sensor which is disposed facing the peripheral surface of an ejector rod 26 to detect the amount of projection of the ejector pin 17.

In the injection molding machine having the above-described structure, when the resin is injected with the injecting nozzle engaging the sprue bush 12, the resin flows through the sprue 10, the runner 24 and the gate 25 and finally enters the cavity 23.

Upon the completion of the injection step, the resin is cooled and shrinks. To cope with this shrinkage, a pressure maintaining step serves to replenish the resin into the cavity 23. Thereafter, when the resin has been cooled, the movable die 2 is withdrawn leftward as viewed in FIG. 8, away from the stationary die 1, thus effecting a die opening step.

Figure 8:
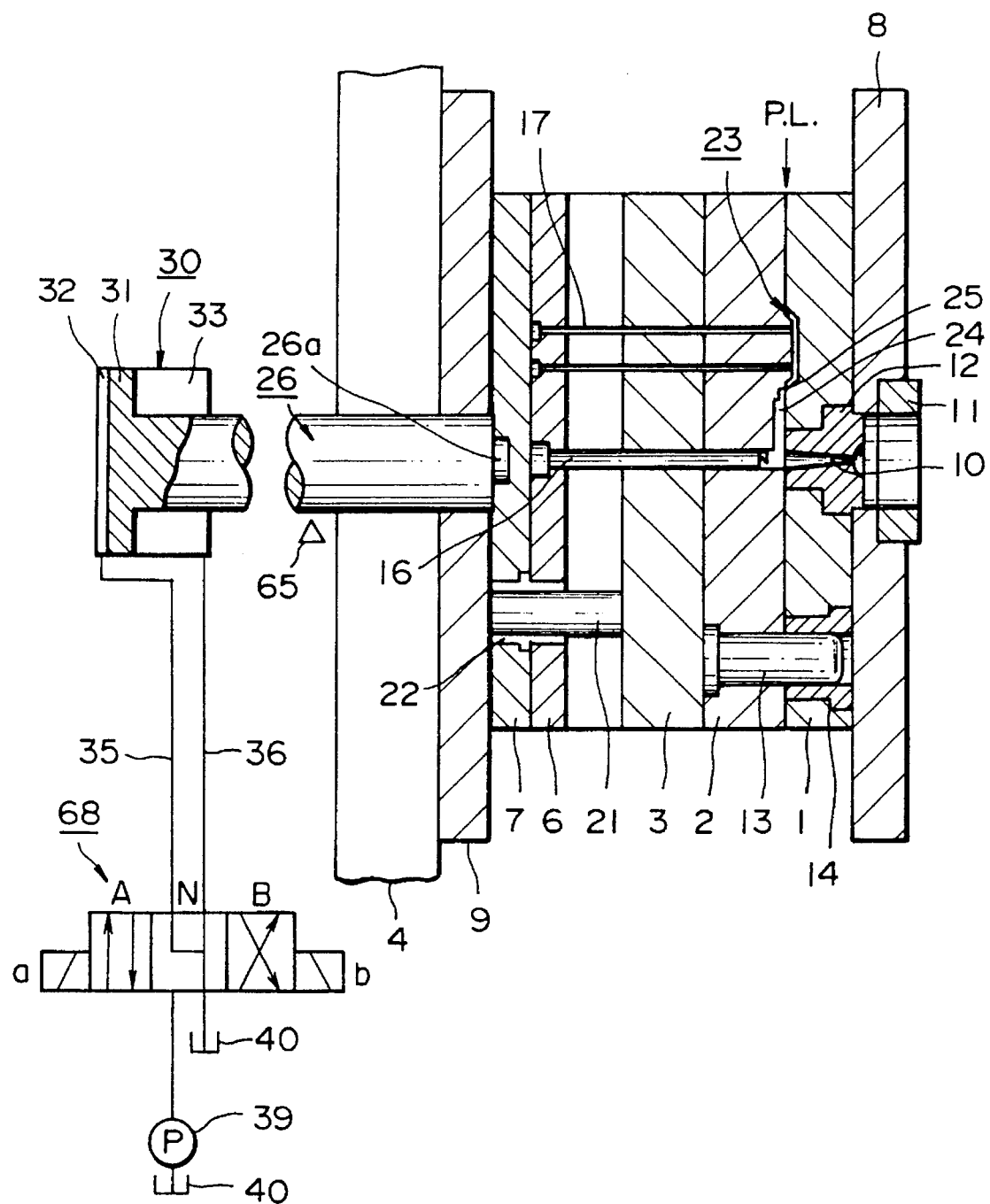
FIG. 8 is a sectional view of an injection molding machine according to a third embodiment of the present invention.

At this time, the ejector pin 17 is advanced rightward as viewed in FIG. 8 to eject the molded product from the movable die 2. For this purpose, the above-described ejector rod 26 is fixedly attached to the back of the lower ejector plate 7. The ejector rod 26 is advanced and withdrawn by an ejecting cylinder 30 serving as a drive means. Reference numeral 26a denotes a screw portion of the ejector rod 26.

The ejecting cylinder 30 includes a slidable piston 31 which defines a first oil chamber 32 and a second oil chamber 33. The first and second oil chambers 32 and 33 are connected to a hydraulic valve 68 through oil passages 35 and 36, respectively. An oil pump 39 supplies oil into the first and second oil chambers 32 and 33. Reference numeral 40 denotes an oil tank.

The hydraulic valve 68 is operated by solenoids a and b, so that it assumes a position A when solenoid a is turned ON, thereby permitting oil discharged by the oil pump 39 to flow through oil passage 36 into the first oil chamber 32, while permitting the oil in the second oil chamber 33 to drain through oil passage 35 into the oil tank 40. At this time, the ejector rod 26 is advanced.

Similarly, the hydraulic valve 68 assumes a position B when solenoid b is turned ON, thereby permitting oil discharged by the oil pump 39 to flow through oil passage 36 into the second oil chamber 33, while permitting the oil in the first oil chamber 32 to drain through oil passage 35 into the oil tank 40. At this time, the ejector rod 26 is withdrawn.

Further, the hydraulic valve 68 assumes a position N when the solenoids a and b are turned OFF, thereby permitting the oil in the first and second oil chambers 32 and 33 to be drained through the oil passages 35 and 36 into the oil tank 40.

In the above-described ejecting mechanism, both the advancing movement and the withdrawing movement of the ejector rod 26 fixed to the lower ejector plate 7 are produced by the ejecting cylinder 30. However, the ejecting mechanism may be modified such that only the advancing movement of the ejector rod 26 is produced by the ejecting cylinder 30, and the withdrawing movement of the ejector rod 26 is produced by spring force of a return spring (not shown).

Figure 9:
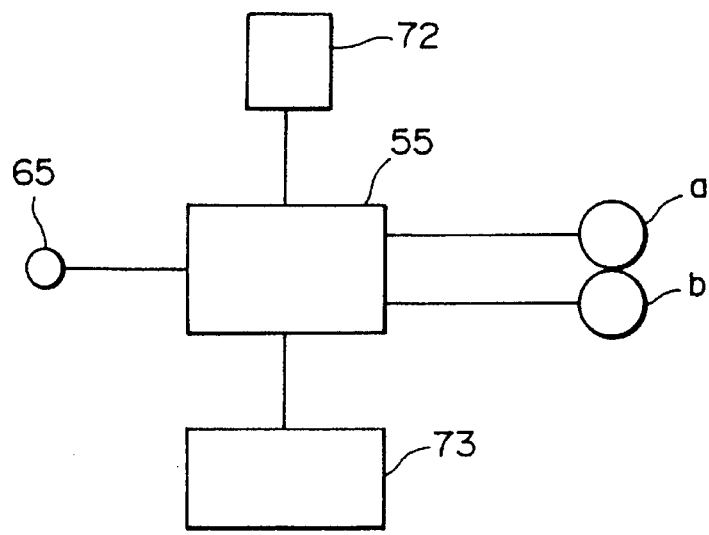
FIG. 9 is a block diagram showing a controller for controlling the ejecting mechanism in the third embodiment of the present invention.

In FIG. 9, reference numeral 55 denotes a controller which controls the entire operation of the injection molding machine. Only the controlling of the ejector device will be described here. A memory 72 and an input device 73 are connected to the controller 55. Also, the solenoids a and b of the hydraulic valve 68 (shown in FIG. 8) and the position sensor 65 are connected to the controller 55 so that the solenoids a and b are operated based on the amount of projection of the ejector pin 17 detected by the position sensor 65.

The operation of the injection molding machine having the above-described structure will be described below.

When solenoid a is turned ON and solenoid b is turned OFF, the ejector rod 26 is advanced to move the ejector pin 17 forward. When solenoid a is turned OFF and solenoid b is turned ON, the ejector rod 26 is withdrawn to move the ejector pin 17 backward. The ejector pin 17 can be moved while repeating very small reciprocation in the forward and backward directions within a predetermined range of the entire stroke.

Such a very small reciprocation is obtained by advancing the ejector pin 17 by a first, very short distance (or for a first period of time) Lf and withdrawing the ejector pin 17 by a second, very small distance (or for a second period of time) Lb. The first and second very short distances (or the first and second periods) Lf and Lb are set such that the inequality Lf>Lb is satisfied in the advancing step and such that the inequality Lf<Lb is satisfied in the withdrawing step.

The above-described very small reciprocation may be obtained by vibrating the ejector pin 17.

The preset range (the preset distance or the preset period of time) may be set based on the lapse of time after the advancing step is started, or the amount of projection of the ejector pin 17 from the withdrawn position.

The injection molding machine can be operated in an automatic mode, a semi-automatic mode or a manual vibration mode, and the selection of the operational mode is performed by operating the input device 73.

Figure 10:
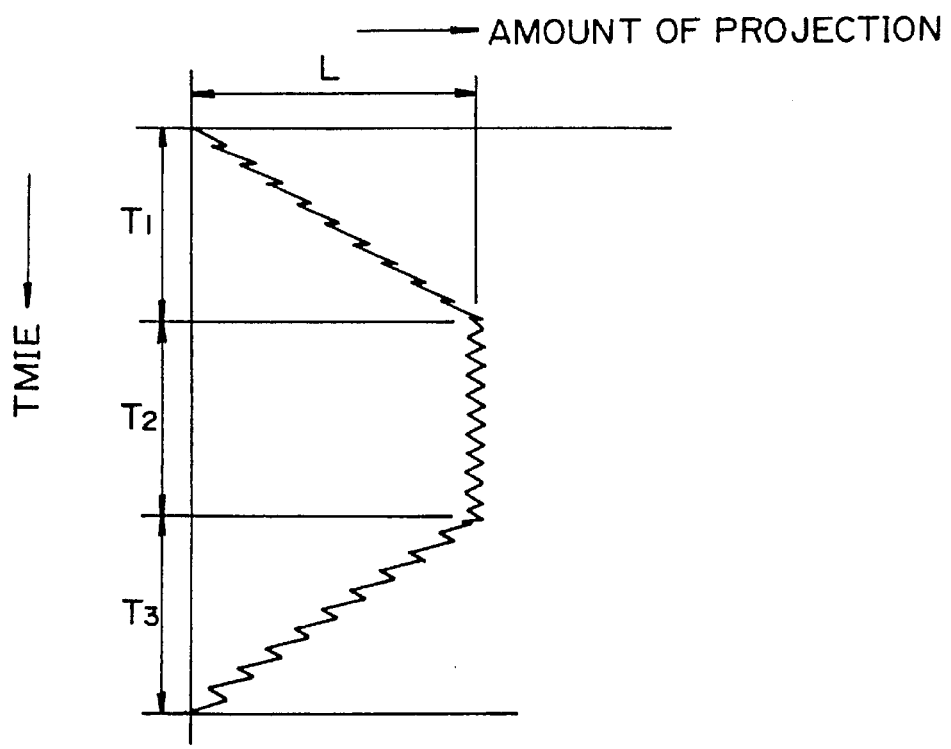
FIG. 10 is a graph showing the relationship between the amount of projection and time in the third embodiment of the present invention.

In the automatic mode, semi-automatic mode, and manual vibration mode, the solenoids a and b are controlled to perform an ejecting operation which includes an advancing step, a dwell step in which very small reciprocation is effected at a constant position, and a withdrawing step. That is, as shown in FIG. 10, the ejector pin 17 is advanced during a period of time T1, and is then held at a constant position, i.e., at a projected position during a period of time T2. The ejector pin 17 is thereafter withdrawn during a period of time T3.

In the advancing step, the solenoids a and b are repeatedly turned ON and OFF to move the ejector pin 17 with very small reciprocation over the entire range for the advancing step. If the ejector pin 17 is advanced without very small reciprocation, energy due to the ejection is accumulated in the molded product as the amount of projection increases, and such energy is instantaneously discharged when the molded product separates from the die. This causes scattering of the molded products and the generation of cracks in the molded product. Accordingly, the speed of projection must be set to be very low.

By contrast, in the present embodiment, the ejector pin 17 is advanced with very small reciprocation, which repeatedly provides advancing and withdrawing movements in a very short time. In this case, energy due to the projection of the ejector pin 17 is continuously and gradually dissipated. Therefore, the speed of projection can be increased by an amount corresponding to the degree of gradual discharge of energy so as to shorten the operational cycle time. Moreover, it becomes unnecessary to vary the speed of projection during the advancing step from the withdrawn position to the projected position. This facilitates setting the speed.

In addition, scattering of the molded products, and generation of cracks in the molded products can be prevented.

Also, in the manual vibration mode, the ejector pin 17 can be subjected to the above-described very small reciprocation, as in the automatic mode and the semi-automatic mode, to facilitate checking the operation of the injection molding machine. As a result, high operability can be achieved.

After the ejector pin 17 has been moved from the withdrawn position by a distance L to reach its projected position, the dwell step is started. In the dwell step, the ejector pin 17 is maintained at the projected position, but is reciprocated by a very short stroke, by repeatedly turning ON and OFF the solenoids a and b, over the entire range of the dwell step. This dwell step with very small reciprocation guarantees the separation of molded products from the die.

The distance L from the withdrawn position to the projected position is set to be small when the depth or thickness of products to be molded is small, and to be large when the depth or thickness of the products is large.

In the subsequent withdrawing step, the ejector pin 17 is withdrawn while very small reciprocation is performed by repeatedly turning ON and OFF the solenoids a and b over the range for the withdrawing step. If the ejector pin 17 is withdrawn without very small reciprocation, problems sometimes occur in that a molded product separated from the movable die 2 may be placed back into the cavity 23 due to the attachment of the molded product to the ejector pin 17, and that the molded product may remain in the movable die 2 due to partial engagement with the movable die 2 or static electricity.

In the present embodiment, since the ejector pin 17 is withdrawn while undergoing very small reciprocation, the molded product is easily separated from the ejector pin 17, and accordingly, is prevented from being placed back into the cavity 23.

Also, the molded product partially engaged with the movable die 2 can be separated from the movable die 2 by the very small reciprocation.

Moreover, since the molded product is sufficiently separated from the movable die 2, the molded product is prevented from electrostatically adhering to the movable die 2. Accordingly, it becomes possible to prevent the molded product from being caught by the dies during a subsequent die closing operation.

In the withdrawing step, since oil in the first oil chamber 32 is gradually drained, the lower ejector plate 7 is withdrawn at a lower speed so that the shock generated upon the collision of the lower ejector plate 7 against the movable mounting plate 9 is reduced. Moreover, it becomes unnecessary to provide throttles in the oil passage 35, the oil valve 68, and the like.

The very small reciprocation in the advancing step, the dwell step and the withdrawing step is obtained by repeating an advancing movement of a very short distance Lf and a withdrawing movement of a very short distance Lb, and the time required for advancement the very short distance Lf and for the withdrawing the very short distance Lb should be within 0.1 seconds. The same strokes and velocities can be set for the advancing movement in the very short distance Lf and the withdrawing movement in the very short distance Lb, regardless of the type of product to be molded. For example, the ejector pin 17 can be advanced at a medium or high speed in the very short distance Lf, and can be withdrawn at a medium or high speed in the very short distance Lb. These projecting and withdrawing movements are repeated.

Accordingly, an operator is required to set only the above described distance L, the advancing speed and the withdrawing speed. This simplifies setting of the speed. When the resistance which acts on the ejecting mechanism during the ejecting operation, i.e., the pressure in the first oil chamber 32 becomes too large (or the current supplied to a servomotor becomes too large), the advancing speed is preferably reduced. Also, it may be possible to automatically increase the advancing speed after the pressure in the first oil chamber 32 decreases (or the current supplied to the servomotor decreases).

In the present embodiment, the ejecting cylinder 30 is used as a drive means for advancing and withdrawing the ejector rod 26. However, in the case where a servomotor is used in place of the ejecting cylinder 30, the rotational speed of the servomotor is controlled in place of the speed of the piston rod of the cylinder 30, the current or torque of the servomotor is controlled in place of the pressure of the cylinder 30, and the number of pulses supplied to the servomotor is controlled in place of the position of the piston rod.

Figure 11:
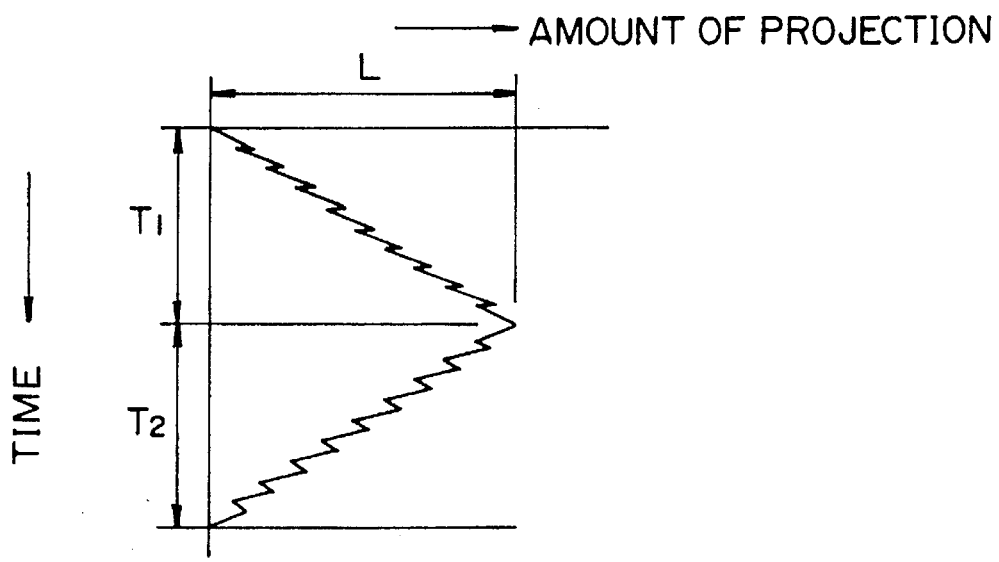
FIG. 11 is a graph showing the relationship between the amount of projection and time in a fourth embodiment of the present invention.

Next, a fourth embodiment of the present invention will be described with reference to FIG. 11 which shows the relationship between the amount of projection of an ejector pin and time in an ejecting operation. In this fourth embodiment, the ejector pin 17 is moved while undergoing very small reciprocation over the entire range of the advancing step and over the entire range of the withdrawing step. That is, the ejector pin 17 (see FIG. 8) is advanced during a period of time $T_1$ accompanied by very small reciprocation, and is then withdrawn during a period of time $T_3$ accompanied by very small reciprocation. The ejecting operation of the present embodiment does not include a dwell step. Accordingly, the operational cycle time can be shortened by an amount corresponding to the length of the dwell step.

Figure 12:
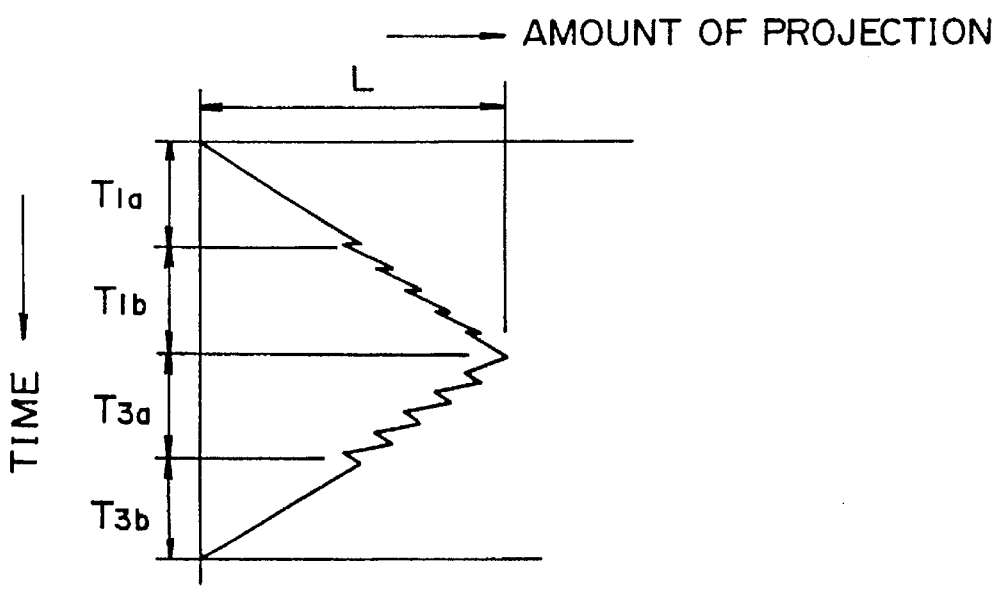
FIG. 12 is a graph showing the relationship between the amount of projection and time in a fifth embodiment of the present invention.

Next, a fifth embodiment of the present invention will be described with reference to FIG. 12 which shows the relationship between the amount of projection of an ejector pin and time in an ejecting operation according to the fifth embodiment.

The ejecting operation according to the fifth embodiment is suitable for use in molding products having a small thickness or depth.

In the ejecting operation, very small reciprocation is added to the movement of the ejector pin 17 (see FIG. 8) over a preset range in the advancing step and over a preset range in the withdrawing step. That is, the ejector pin 17 is advanced without very small reciprocation during a period of time $T_{1a}$ and is then advanced during a period of time $T_{1b}$ with very small reciprocation. Thereafter, the ejector pin 17 is withdrawn during a period of time $T_{3a}$ with very small reciprocation, and is then withdrawn without very small reciprocation during a period of time $T_{3b}$. The ejecting operation of the present embodiment does not include a dwell step. Accordingly, the operational cycle time can be shortened by an amount corresponding to the length of the dwell step. Since the ejector pin 17 can be moved faster during the periods of time when very small reciprocation is not applied to the ejector rod 17, the operational cycle time can be shortened much more.

Figure 13:
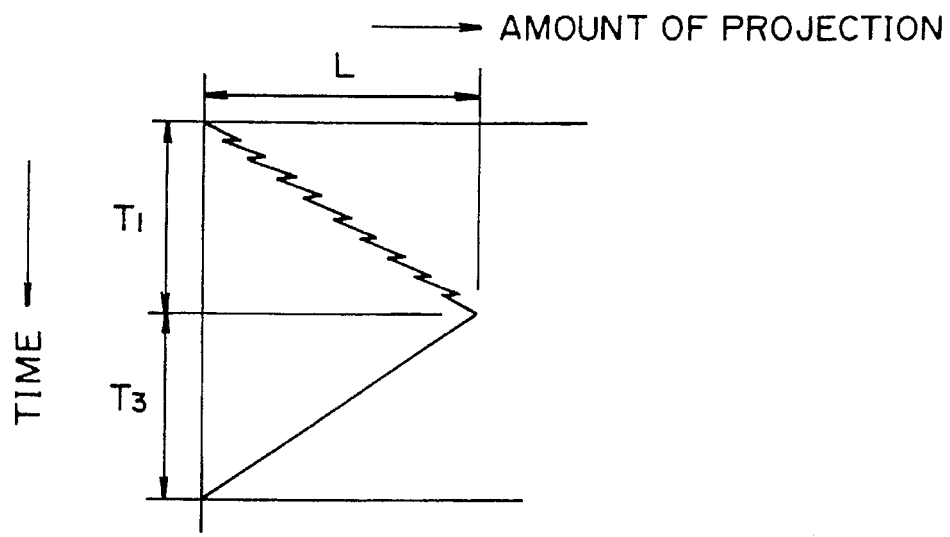
FIG. 13 is a graph showing the relationship between the amount of projection and time in a sixth embodiment of the present invention.

Next, a sixth embodiment will be described with reference to FIG. 13 which shows the relationship between the amount of projection of an ejector pin and time in an ejecting operation.

In the sixth embodiment, very small reciprocation is added to the movement of the ejector pin 17 (see FIG. 8) over the entire range of the advancing step. In detail, the ejector pin 17 is advanced with very small reciprocation during a period of time $T_1$, and is then withdrawn without very small reciprocation during a period of time $T_3$. The ejecting operation of the present embodiment does not include a dwell step. Accordingly, the operational cycle time can be shortened by an amount corresponding to the length of the dwell step. Since the ejector pin 17 can be moved faster during the periods of time when very small reciprocation is not applied to the ejector rod 17, the operational cycle time can be shortened much more.

Figure 14:
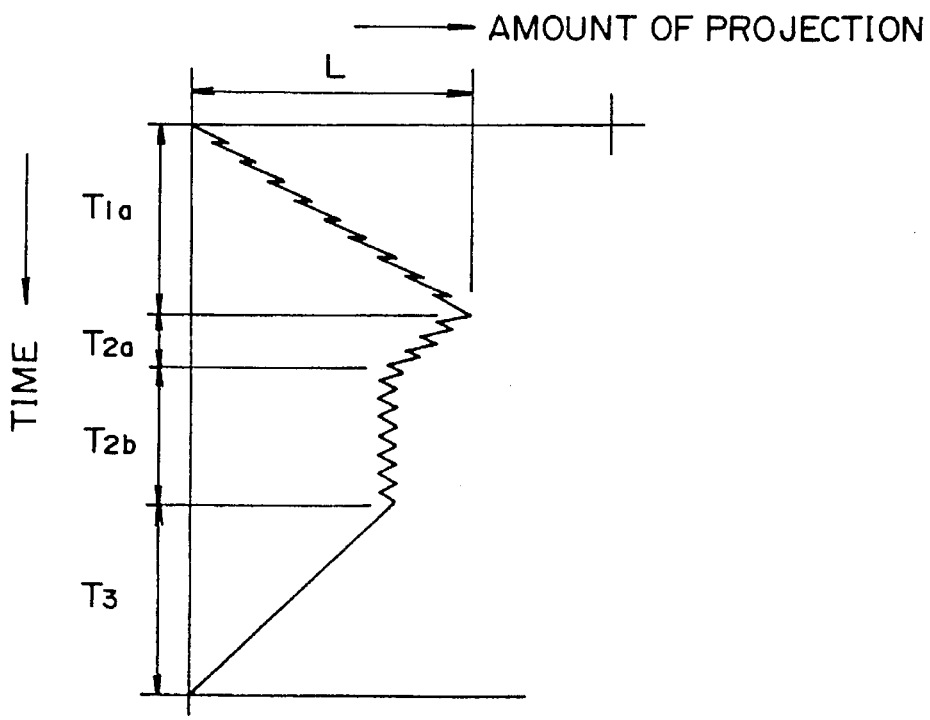
FIG. 14 is a graph showing the relationship between the amount of projection and time in a seventh embodiment of the present invention.

Next, a seventh embodiment will be described with reference to FIG. 14 which shows the relationship between the amount of projection of an ejector pin and time in an ejecting operation.

In the seventh embodiment, very small reciprocation is applied to the movement of the ejector pin 17 (see FIG. 8) over the entire range of the advancing step and the entire range of the dwell step. In detail, the ejector pin 17 is advanced during a period of time $T_1$ while undergoing very small reciprocation, and is then shortly withdrawn with very small reciprocation during a period of time $T_{2a}$. The ejector pin 17 is then maintained at a constant position while being subjected to very small reciprocation during a period of time $T_{2b}$, and is again withdrawn without very small reciprocation during a period of time $T_3$.

Accordingly, during the dwell step, the ejector pin 17 is maintained at a constant position which is located rearward of the projected position, and it is thereby possible to secure a sufficient space for the very small reciprocation even in the case where the stroke for opening and closing the die and the time for the die opening operation are not large.

Figure 15:
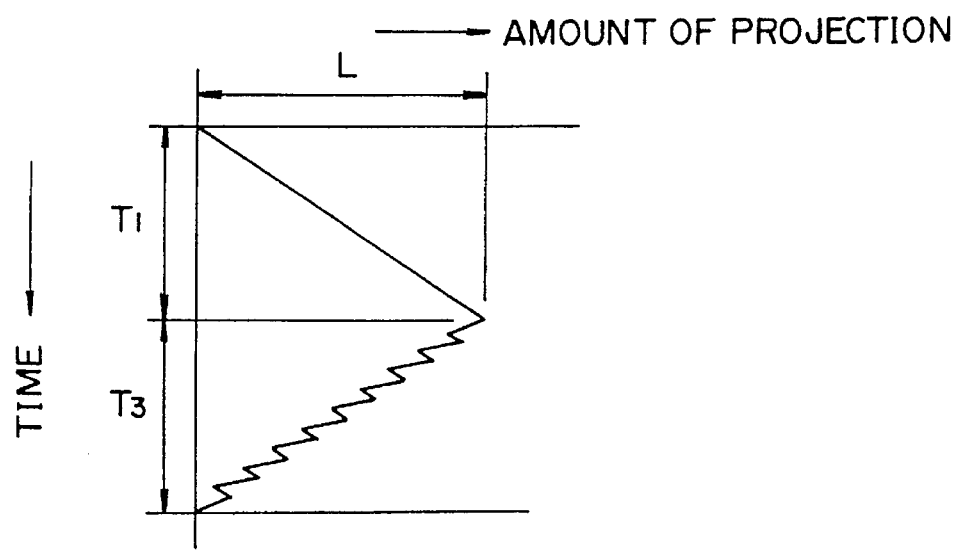
FIG. 15 is a graph showing the relationship between the amount of projection and time in an eighth embodiment of the present invention.

Next, an eighth embodiment will be described with reference to FIG. 15 which shows the relationship between the amount of projection of an ejector pin and time in an ejecting operation. In FIG. 15, the abscissa represents the amount of projection while the ordinate represents time.

In the eighth embodiment, very small reciprocation is applied to the movement of the ejector pin 17 (see FIG. 8) over the entire range of the withdrawing step. In detail, the ejector pin 17 is advanced without vibration during a period of time $T_1$, and is then withdrawn with very small vibration during a period of time $T_3$. The ejecting operation of the present embodiment does not include a dwell step. Accordingly, the operational cycle time can be shortened by an amount corresponding to the length of the dwell step. Since the ejector pin 17 can be moved faster during the periods of time when vibration is not applied to the ejector rod 17, the operational cycle time can be shortened much more.

Figure 16:
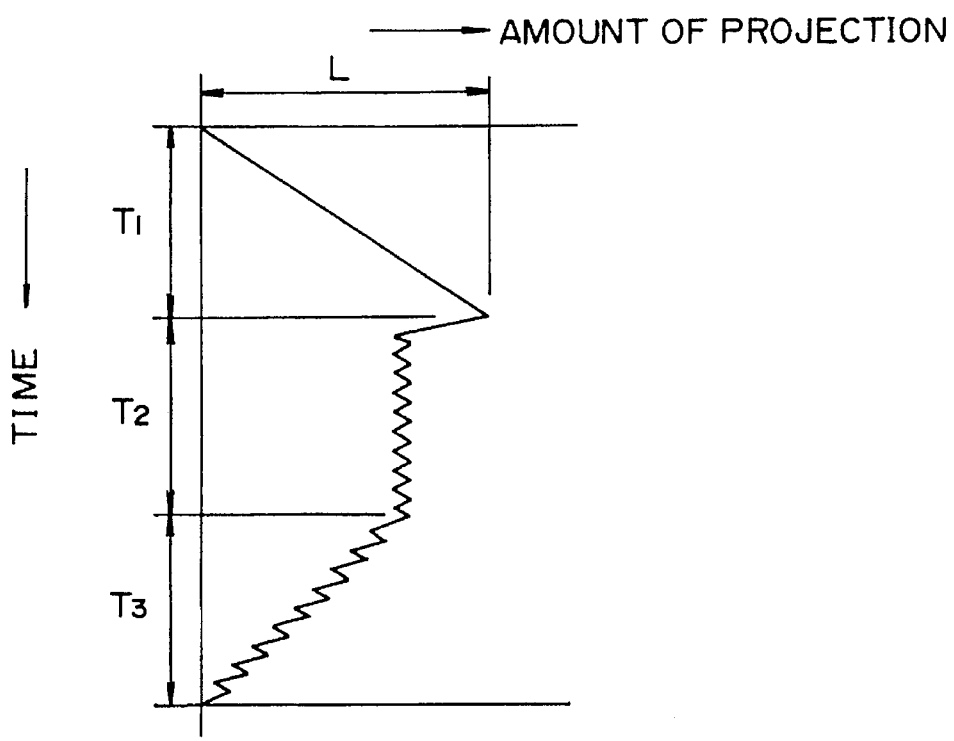
FIG. 16 is a graph showing the relationship between the amount of projection and time in a ninth embodiment of the present invention.

Next, a ninth embodiment will be described with reference to FIG. 16 which shows the relationship between the amount of projection of an ejector pin and time in an ejecting operation.

In the ninth embodiment, very small reciprocation is applied to the movement of the ejector pin 17 (see FIG. 8) over the entire range of the withdrawing step and the entire range of the dwell step. In detail, the ejector pin 17 is advanced without vibration during a period of time $T_1$, and is then shortly withdrawn and is then maintained at a constant position while being subjected to very small reciprocation during a period of time $T_2$. After that, the ejector pin 17 is again withdrawn during a period of time $T_3$ while very small reciprocation is performed.

Accordingly, during the dwell step, the ejector pin 17 is maintained at a constant position which is located rearward of the projected position, and it is thereby possible to secure a sufficient space for the very small reciprocation even where the strokes for opening and closing the die and the time for the die opening operation are not sufficiently large.

In the present embodiment, the very small reciprocation is applied to the ejector pin 17 over the entire range of the withdrawing step and over the entire range of the dwell step. However, in the alternative, the very small reciprocation may be applied to the ejector pin 17 over the entire range of the advancing step and over the entire range of the dwell step.

In each of the previous embodiments, the ejecting cylinder 30 is used as the driving device for advancing and withdrawing the ejector rod 26 but, when a servomotor is used in place of the ejecting cylinder 30, the number of revolutions may be controlled in place of the speed, and the number of pulses may be controlled in place of the position. In this case, the resisting force opposing the spring force of the return spring can be controlled by the electric current supplied to the servomotor, and the speed of the ejector rod 26 can be controlled by the number of pulses.

Figure 17:
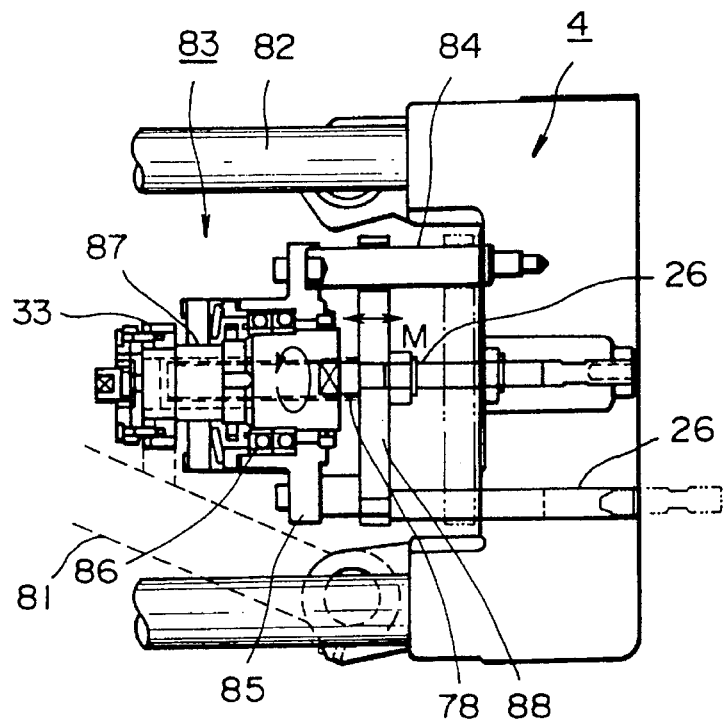
FIG. 17 is a front view of a single-shaft type ejector device according to a tenth embodiment of the present invention.
Figure 18:
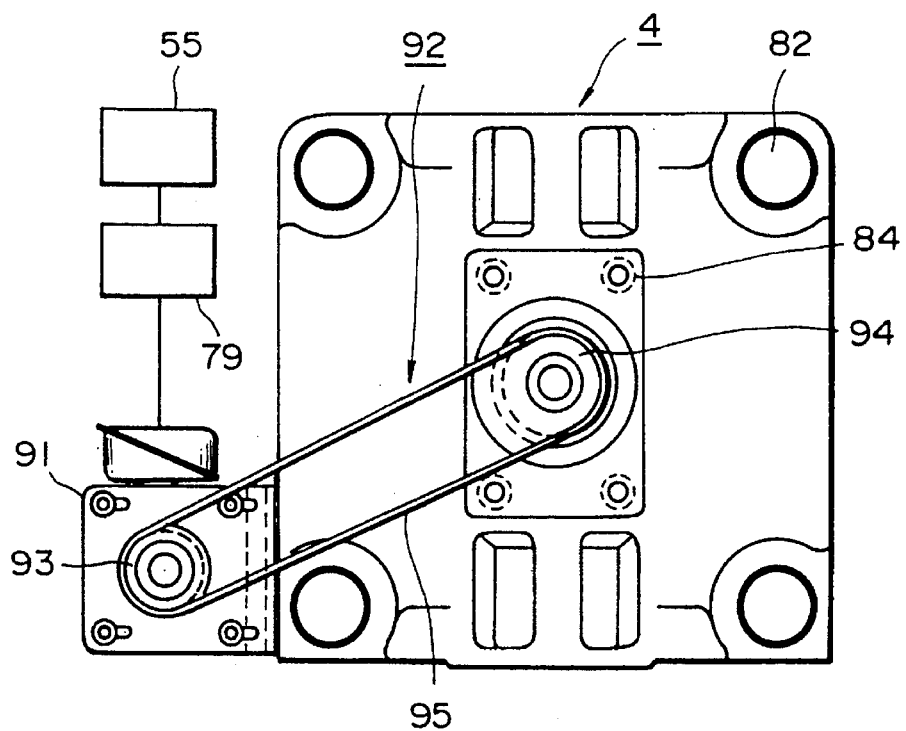
FIG. 18 is a side view of the single-shaft type ejector device according to the tenth embodiment of the present invention.

FIG. 17 is a front view of a single-shaft type ejector device according to a tenth embodiment of the present invention, and FIG. 18 is a side view of the single-shaft type ejector device shown in FIG. 17. In these drawings, reference numeral 4 denotes a movable platen. A movable die (not shown) is attached to the front end (the righthand end in FIG. 17) of the movable platen 4. The movable platen 4 is advanced and withdrawn by a toggle mechanism 81 along tie bars 82 which are supported between an unillustrated stationary platen and a toggle support.

An ejector pin feed mechanism 83 is attached to the rear end (the left-hand end in FIG. 17) of the movable platen 4. The ejector pin feed mechanism 83 includes guide posts 84, the front ends of which are fixed to the movable platen 4, and a support member 85 fixed to the rear ends of the guide posts 84. A nut 87 is rotatably supported by the support member 85 via bearings 86.

The nut 87 is screw-engaged with a screw shaft 78 at its inner surface, and a cross head 88 is fixed to the front end of the screw shaft 78. Ejector rods 26 are fixed to the front end of the cross head 88. Accordingly, when the nut 87 is rotated, the screw shaft 78 is reciprocated in the direction indicated by arrow M, so that the ejector rods 26 are reciprocated in the same manner.

To operate the ejector pin feed apparatus 83 by a servomotor 91, a belt transmission mechanism 92 is provided between the servomotor 91 and the nut 87. The belt transmission mechanism 92 is composed of a pulley 93 fixed to the output shaft of the servomotor 91, a pulley 94 fixed to the rear end of the nut 87, and a timing belt 95 which is wound between the pulleys 93 and 94 under tension.

Accordingly, when the servomotor 91 is driven, the rotation of the servomotor 91 is transmitted to the nut 87 via the belt transmission mechanism 92. The rotational movement is converted to linear movement by the nut 87 and the screw shaft 78 so that the unillustrated ejector pins are advanced and withdrawn.

The servomotor 91 is driven by a motor driver 79 which is controlled by a controller 55.

When the ejector pin is moved back and forth to provide very small reciprocation, the servomotor 91 is driven to alternately rotate in the forward and reverse directions so that the nut 87 alternately rotates in the forward and reverse directions.

At this time, a torque is generated in proportion to the current supplied to the servomotor 91, and a force F proportional to the torque is applied to the ejector rods 26. Accordingly, assuming that the total area of the front ends of the ejector pins is SE, pressure applied to a molded product is expressed as follows:

P=F/SE.

The amount of movement of the ejector pins is related to the rotational amount of the servomotor 91. Accordingly, very short distances Lf and Lb in the very small reciprocation can be set based on the number of pulses of current supplied to the servomotor 91. To this end, an unillustrated pulse counter is provided in the controller 55 to count the pulses of current supplied to the servomotor 91.

Figure 19:
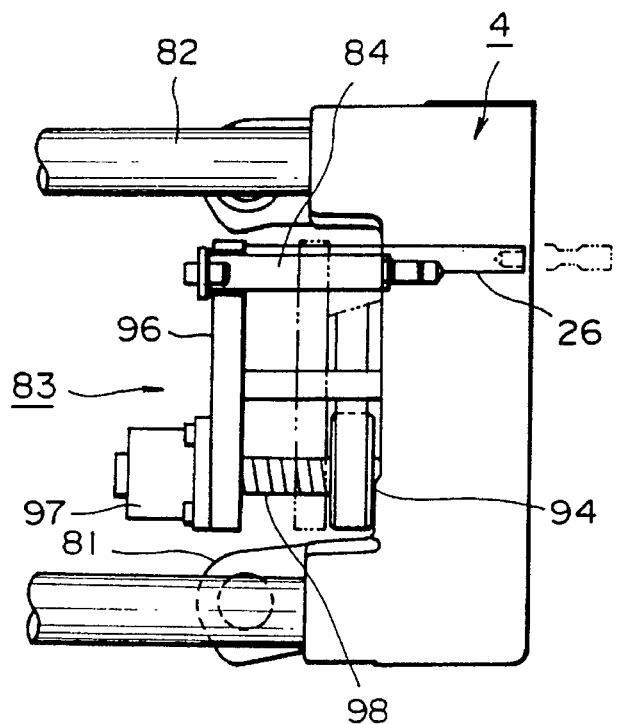
FIG. 19 is a front view of a two-shaft type ejector device according to an eleventh embodiment of the present invention.
Figure 20:
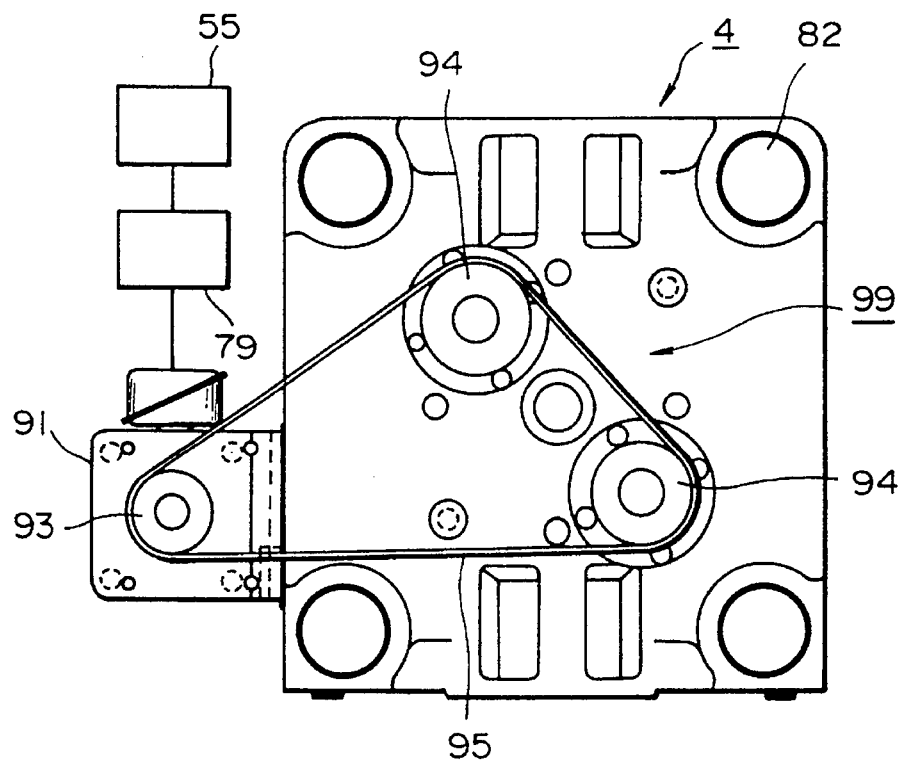
FIG. 20 is a side view of the two-shaft type ejector device according to the eleventh embodiment of the present invention.

Next, a two-shaft type ejector device will be described with reference to FIG. 19 which is a front view of a two-shaft type ejector device according to an eleventh embodiment of the present invention, and FIG. 20 is a side view of the two-shaft type ejector device shown in FIG. 19. In these drawings, reference numeral 4 denotes a movable platen. A movable die (not shown) is attached to the front end (the righthand end in FIG. 19) of the movable platen 4. The movable platen 4 is advanced and withdrawn by a toggle mechanism 81 along tie bars 82 which are supported between an unillustrated stationary platen and a toggle support.

An ejector pin feed mechanism 83 is attached to the rear end (the left-hand end in FIG. 19) of the movable platen 4. The ejector pin feed mechanism 83 includes guide posts 84, the front ends of which are fixed to the movable platen 4, and a cross head 96 fixed to the rear ends of the guide posts 84. Nuts 97 are fixed to the cross head 96.

The nuts 97 are screw-engaged with screw shafts 98 at their inner surfaces, and the forward ends of the screw shafts 98 are rotatably supported by unillustrated bearings.

Ejector rods 26 are fixed to the front end of the cross head 96. Accordingly, when the screw shafts 98 are rotated, the cross head 96 is reciprocated so that the ejector rods 26 are reciprocated in the same manner.

To operate the ejector pin feed apparatus 83 by a servomotor 91, a belt transmission mechanism 99 is provided between the servomotor 91 and the screw shafts 98. The belt transmission mechanism 99 is composed of a pulley 93 fixed to the output shaft of the servomotor 91, a plurality of pulleys 94 fixed to the front ends of the screw shafts 98, and a timing belt 95 which is wound between the pulleys 93 and 94 under tension.

Accordingly, when the servomotor 91 is driven, the rotation of the servomotor 91 is transmitted to the screw-shafts 98 via the belt transmission mechanism 99. The rotational movement is converted to linear movement by the screw shafts 98 and the nuts 97 so that the unillustrated ejector pins are advanced and withdrawn.

The servomotor 91 is driven by a motor driver 79 which is controlled by a controller 55, as in the tenth embodiment.

Although only a limited number of embodiments of the present invention have been described, it should be understood that the present invention is not limited thereto, and that various modifications and variations can be made without departing from the spirit and scope of the invention defined in the accompanying claims.

What is claimed is:

1. A method for controlling an ejector in a molding apparatus including means defining a mold cavity, the method comprising:
    (a) advancing an ejector pin from a withdrawn position to a projected position thereby ejecting a molded product from the mold cavity;
    (b) withdrawing said ejector pin from the projected position to the withdrawn position, and
    (c) vibrating the ejector pin to cause said ejector pin to undergo reciprocating movements having a period less than 0.1 seconds over a preset range in at least one of said advancing step and said withdrawing step.

2. A method for controlling an ejector according to claim 1, wherein said reciprocating movement is performed over the preset range in said advancing step and wherein each reciprocating movement in said advancing step comprises an advancing movement of said ejector pin over a first distance and a withdrawing movement of said ejector pin over a second distance shorter than said first distance.

3. A method for controlling an ejector according to claim 1, wherein said reciprocating movement is performed over the preset range in said withdrawing step and wherein each reciprocating movement in said withdrawing step comprises an advancing movement of said ejector pin over a first distance and a withdrawing movement of said ejector pin over a second distance longer than said first distance.

4. A method for controlling an ejector according to claim 1 wherein said preset range is a preset distance.

5. A method for controlling an ejector according to claim 1 wherein said preset range is a preset period of time.

6. A method for controlling an ejector in a molding apparatus including means defining a mold cavity, the method comprising:
    (a) advancing an ejector pin from a withdrawn position to a projected position thereby ejecting a molded product from the mold cavity;
    (b) maintaining said ejector pin at the projected position while vibrating said ejector pin to cause said ejector pin to undergo reciprocating movements having a period less than 0.1 seconds; and
    (c) withdrawing said ejector pin from the projected position to the withdrawn position.

7. A method for controlling an ejector according to claim 6, further comprising vibrating said ejector pin to cause said ejector pin to undergo reciprocating movements having a period less than 0.1 seconds over a preset range in at least one of said advancing step and said withdrawing step.

8. A method for controlling an ejector according to claim 7, wherein said reciprocating movement is performed over the preset range in said advancing step and wherein each reciprocating movement in said advancing step comprises an advancing movement of said ejector pin over a first distance and a withdrawing movement of said ejector pin over a second distance shorter than said first distance.

9. A method for controlling an ejector according to claim 7, wherein said reciprocating movement is performed over the preset range in said withdrawing step and wherein each reciprocating movement in said withdrawing step comprises an advancing movement of said ejector pin over a first distance and a withdrawing movement of said ejector pin over a second distance longer than said first distance.

10. A method for controlling an ejector according to claim 6, wherein said advancing step advances said ejector pin by at least one of speed control and pressure control.

11. A method for controlling an ejector according to claim 10, wherein said advancing step comprises:
    advancing said ejector pin under pressure control until lapse of a predetermined time; and
    thereafter further advancing said ejector pin under speed control.

12. A method for controlling an ejector according to claim 10, wherein said advancing step comprises the steps of:

advancing said ejector pin under pressure control until said ejector pin reaches a predetermined change-over position; and thereafter further advancing said ejector pin under speed control.

13. A method for controlling an ejector according to claim 6, further comprising:

further advancing said ejector pin after said maintaining step and before said withdrawing step.

14. A method for controlling an ejector according to claim 6 wherein said preset range is a preset distance.

15. A method for controlling an ejector according to claim 6 wherein said preset range is a preset period of time.

* * * * *